(12) United States Patent
Jones (10) Patent No.: US 10,354,208 B2
(45) Date of Patent: Jul. 16, 2019

(54) SYSTEM AND METHOD FOR DEFINING RUN BOOKS

(75) Inventor: Gordon C. Jones, San Juan Capistrano, CA (US)

(73) Assignee: KASEYA LIMITED, Dublin (IE)

( * ) Notice: Subject to any disclaimer, the term of this patent is extended or adjusted under 35 U.S.C. 154(b) by 1321 days.

(21) Appl. No.: 12/360,227

(22) Filed: Jan. 27, 2009

(65) Prior Publication Data

US 2010/0191771 A1    Jul. 29, 2010

(51) Int. Cl.
*G06F 16/25* (2019.01)
*G06Q 10/06* (2012.01)

(52) U.S. Cl.
CPC .......... *G06Q 10/06* (2013.01); *G06F 16/258* (2019.01)

(58) Field of Classification Search
CPC .......... G06F 17/30519; G06F 17/3056; G06F 1/36881; G06F 17/36881; G06F 16/258; G06Q 10/06
USPC .......................................... 707/602, 999.101
See application file for complete search history.

(56) References Cited

U.S. PATENT DOCUMENTS

| | | | | |
|---|---|---|---|---|
| 5,159,687 A * | 10/1992 | Richburg | ................. | G06F 8/36 706/45 |
| 6,356,920 B1 * | 3/2002 | Vandersluis | .................. | 715/210 |
| 6,601,232 B1 * | 7/2003 | Burba et al. | ................... | 717/100 |
| 6,615,278 B1 * | 9/2003 | Curtis | ................ | G06F 9/44505 719/310 |
| 6,826,725 B1 * | 11/2004 | Beezer et al. | ................ | 715/209 |
| 7,827,134 B2 * | 11/2010 | Prang | ................ | G06F 17/30595 707/602 |
| 2003/0233366 A1 * | 12/2003 | Kesselman | ....... | G06F 17/30368 707/E17.005 |
| 2005/0204198 A1 * | 9/2005 | Pagan | ..................... | G06F 9/445 714/36 |
| 2005/0256908 A1 * | 11/2005 | Yang | ................. | G06F 17/30569 |
| 2006/0017953 A1 * | 1/2006 | Ly et al. | ...................... | 358/1.13 |
| 2007/0130531 A1 * | 6/2007 | Anderson | ................. | G06F 8/34 715/762 |
| 2008/0306986 A1 * | 12/2008 | Doyle, Sr. | .............. | G06Q 10/10 717/136 |
| 2009/0172535 A1 * | 7/2009 | Cheng et al. | .................. | 715/704 |
| 2009/0172537 A1 * | 7/2009 | Cheng | ................... | G06F 3/0481 715/704 |
| 2010/0037095 A1 * | 2/2010 | Gerber | ........................... | 714/15 |

(Continued)

OTHER PUBLICATIONS

Rogers et al. "IBM ABCs of z/Os System Programming vol. 2", Sep. 2008, IBM.*

(Continued)

*Primary Examiner* — Apu M Mofiz
*Assistant Examiner* — Sheryl L Holland (57) ABSTRACT

In a computing environment, metadata may be used to define common aspects such as verbs, policies, categories and variables of run book procedures. Variable data of the procedures may be stored in application files. A procedure may be generated by retrieving a pre-defined metadata definition of a procedure from a metadata database and an application file for the procedure that contains the variable data for the procedure. The metadata and the variable data may be formatted into a procedure which may be incorporated into a run book and/or transmitted to an external machine for execution of the procedure.

18 Claims, 9 Drawing Sheets

(56) References Cited

U.S. PATENT DOCUMENTS

2014/0283118 A1* 9/2014 Anderson ............... G06F 21/51
　　　　　　　　　　　　　　　　　　　726/27

OTHER PUBLICATIONS

"IBM System i, Systems Management Advanced job scheduler", Feb. 2006, IBM, Version 5, Release 4.*
"IBM OS/390, MVS JCL Reference", Sep. 2000, IBM, 10th Edition.*
K. Ivens, "Distributing Registry Changes", Apr. 2001, Windows 2000 Magazine.*
J. Edelen, "Using Group Policy to Deploy XP—Upgrading Client Macihines Efficiently", 2003, www.windowsitpro.com/group-policy/using-group-policy-deploy-xp.*
Hilland et al., "RDMA Protocol Verbs Specification", 2002, https://tools.ietf.org/html/draft-hilland-rddp-verbs-00.*
"COBOL—Basic Verbs", Dec. 29, 2016, https://www.tutorialspoint.com/cobol/cobol_basic_verbs.htm.*

* cited by examiner

SYSTEM AND METHOD FOR DEFINING RUN BOOKS

FIELD OF THE INVENTION

This disclosure relates to systems and methods for aggregating procedures and in particular to defining and documenting procedures of an organization. This disclosure also relates to systems and methods for creating and automating procedures within an organization.

BACKGROUND OF THE INVENTION

Run books are necessary in an organization for documenting the procedures by which the organization operates. A run book may electronically or physically document start up and shut down procedures as well as emergency or crisis management procedures. A run book may also be used to implement the day to day procedural policies of an organization. A particular requirement for run books is to provide sufficiently detailed instructions to enable the organization to operate in the absence of the usual system administrator. Traditional run books are a set of non-computerized steps or actions that have been produced and maintained manually.

What is required is a system, method and computer readable medium that enables run-book procedures to be defined, documented and/or executed from within a computing environment.

SUMMARY OF THE INVENTION

In one aspect of the disclosure, there is provided a method for creating and managing automated computing system run book events comprising. The method comprises defining a plurality of metadata elements, storing the plurality of metadata elements in a database, defining at least one procedure comprising at least one of the plurality of metadata elements, receiving a request for a procedure, retrieving the metadata elements for a requested procedure, and formatting retrieved metadata elements into a procedure.

In one aspect of the disclosure, there is provided a system for generating a run book comprising a plurality of metadata elements, a plurality of application files comprising variable data, and a plurality of procedure definitions defined using at least one of the plurality of metadata elements and at least one of the application files.

In one aspect of the disclosure, there is provided a computer-readable medium comprising computer-executable instructions for execution by a processor, that, when executed, cause the processor to receive a trigger for a procedure, retrieve metadata for a procedure from a database, and format the metadata into a procedure.

BRIEF DESCRIPTION OF THE DRAWINGS

Reference will now be made, by way of example only, to specific embodiments and to the accompanying drawings in which.

DETAILED DESCRIPTION OF THE INVENTION

The present disclosure utilizes the manipulation and use of metadata by a user of that data. Specifically a user and a system can utilize metadata definitions and combinations to define and action services for an organization.

Metadata (meta data, or sometimes metainformation) is "data about data", of any sort in any media. An item of metadata may describe an individual datum, or content item, or a collection of data including multiple content items and hierarchical levels, for example a database schema. In data processing, metadata may include definitional data that provides information about or documentation of other data managed within an application or environment.

For example, metadata may document data about data elements or attributes, (name, size, data type, etc) and data about records or data structures (length, fields, columns, etc) and data about data (where it is located, how it is associated, ownership, etc.). Metadata may include descriptive information about the context, quality and condition, or characteristics of the data.

This disclosure provides for the extension of this information in a manner that allows metadata users to catalog and link objects in a peer-to-peer fashion. Through the linking of metadata defined objects that can be executed on computing systems with the association to an organization, a company can define a run book.

Figure 1:
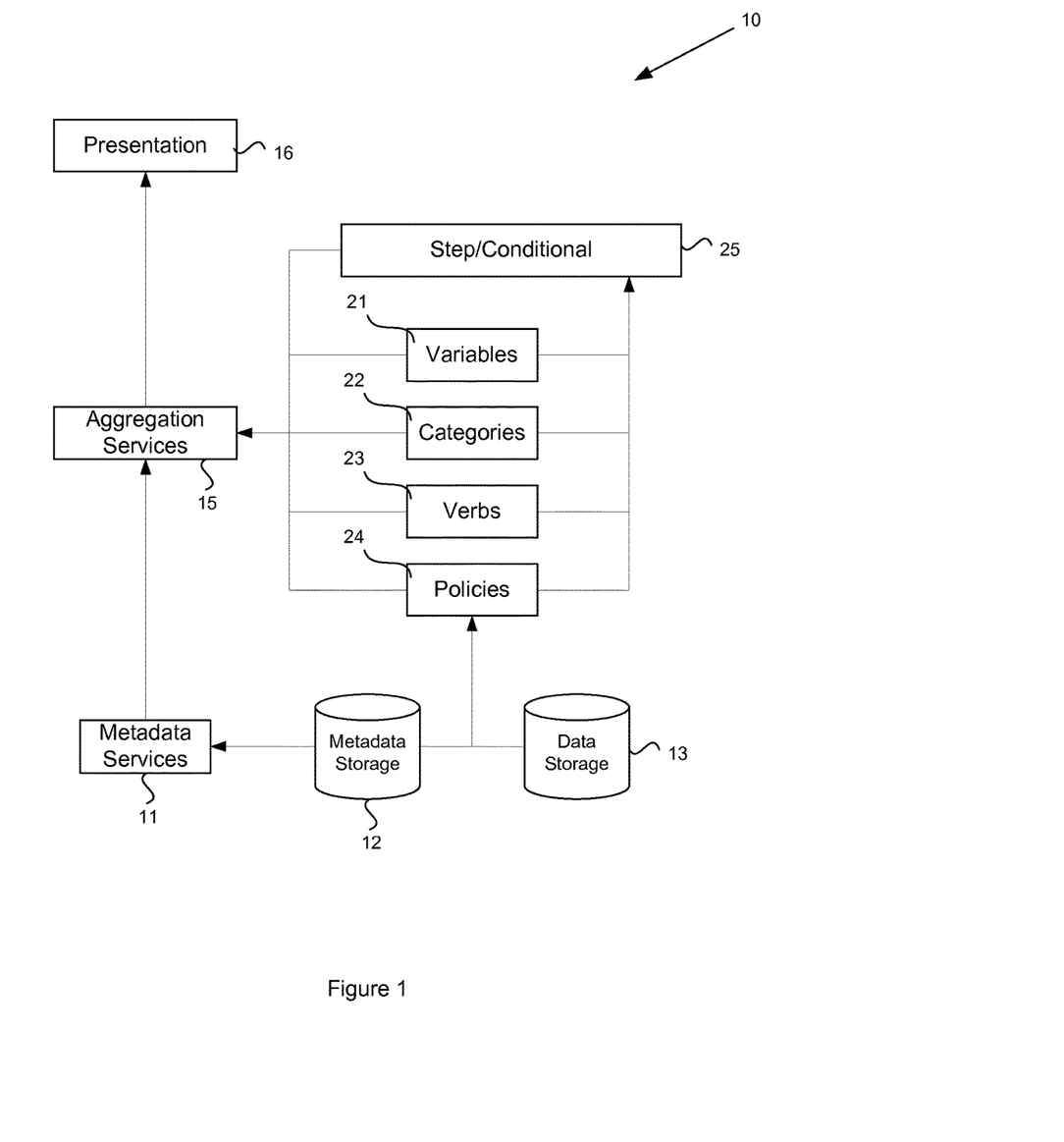
FIG. 1 illustrates a system for aggregating procedures into a run book.

In FIG. 1, there is shown a system 10 for aggregating procedures into a run book. In the system 10, a metadata services module 11 retrieves metadata from a metadata storage 12 and data stored in a data storage 13. The metadata may include variables 21, categories 22, verbs 23, and policies 24 and step/conditional elements 25, as will be described in greater detail below, which can be used to instantiate the contract organization computing procedures and procedure navigation framework within a computing system. This metadata describes the methods to implement computing system activities on computing system consumer machines. Examples of computing system activities may include configuration (or re-configuration) of machines, testing, maintenance, etc.

The metadata services module 11 of the system 10 may use the metadata of metadata storage 12 to form procedures, as will be described in greater detail below. An aggregation services module 15 of the system 10 may receive procedures from the metadata services module 11 to formulate a run book of procedures for the system 10. The aggregation services 15 may format the aggregated run book into a presentation 16, which may be a human readable presentation or a machine readable presentation. In addition, the aggregated run book may be presented to an external system machine (not shown).

Figure 2:
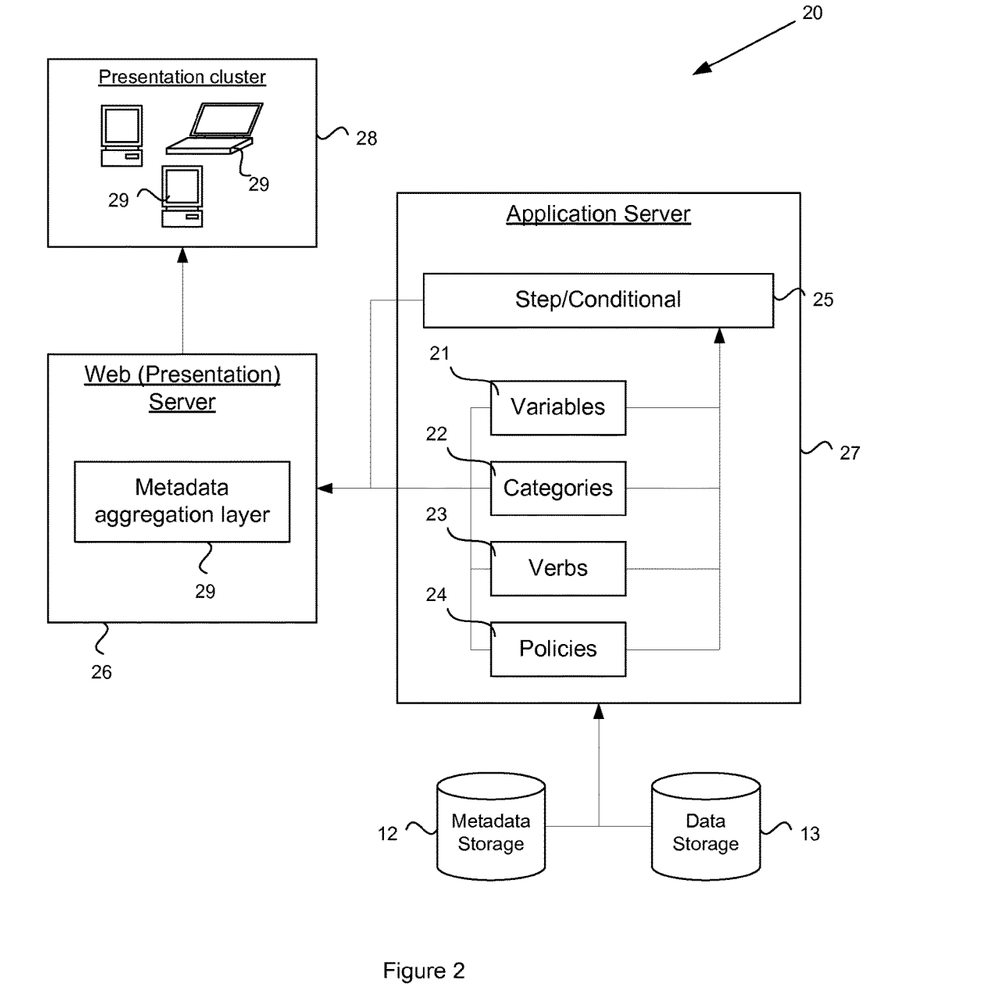
FIG. 2 illustrates a system for creating and managing automated computing system run book events.

In FIG. 2, there is shown a system 20 for creating and managing automated computing system run book events. In addition to the metadata storage 12 and data storage 13, the system 20 includes an application server 27, which may include the metadata services 11 and/or aggregation services 19 shown in FIG. 1. The application server 27 may use the metadata verbs, parameters and procedures to provide a dynamic aggregation method that provides the ability to establish, edit and offer to computing system providers a mechanism to create, document and execute new metadata driven procedures. These methods can be instantiated by pre-determined events or may be scheduled for action. A web server 26 provides a presentation server that in one instance may be used as an interface, such as a metadata aggregation layer 29, for a user to access the application server for creating the metadata and defining metadata driven procedures. In a second instance, the web server 26 may present metadata driven procedures from the application server 27 to one or more workstations 29 in a presentation cluster 28. The workstations 29 may include laptop computers, desktop computers, hand held computer or any other appropriate computing devices as will be apparent to a person skilled in the art.

The metadata storage 12 may be based on a relational database management system environment that can store the metadata elements (verbs, policies, categories, variable definitions and conditional step) that comprise a procedure. The data of data storage 13 is typically a series of application files, e.g. procedure files, that contain the variable data used in a procedure.

Figure 3:
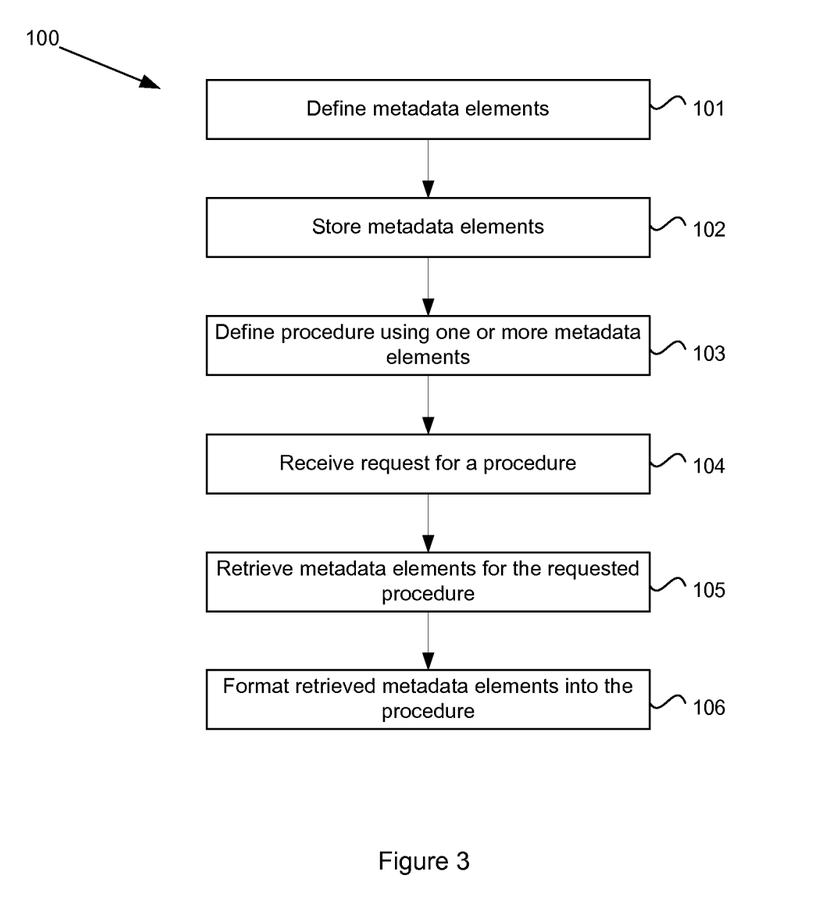
FIG. 3 illustrates a method for creating and managing automated computing system run book events.

A method for creating and managing automated computing system run book events in the systems 10, 20 is illustrated in the flowchart 100 of FIG. 3. Initially, the metadata elements are defined 101 and stored 102 in the metadata database 12. Once the metadata elements have been defined, one or more of the metadata elements may be used to define a procedure 103. When a request for a defined procedure is received 104, the metadata elements for a requested procedure are retrieved 105 and formatted into a procedure 106.

Figure 4:
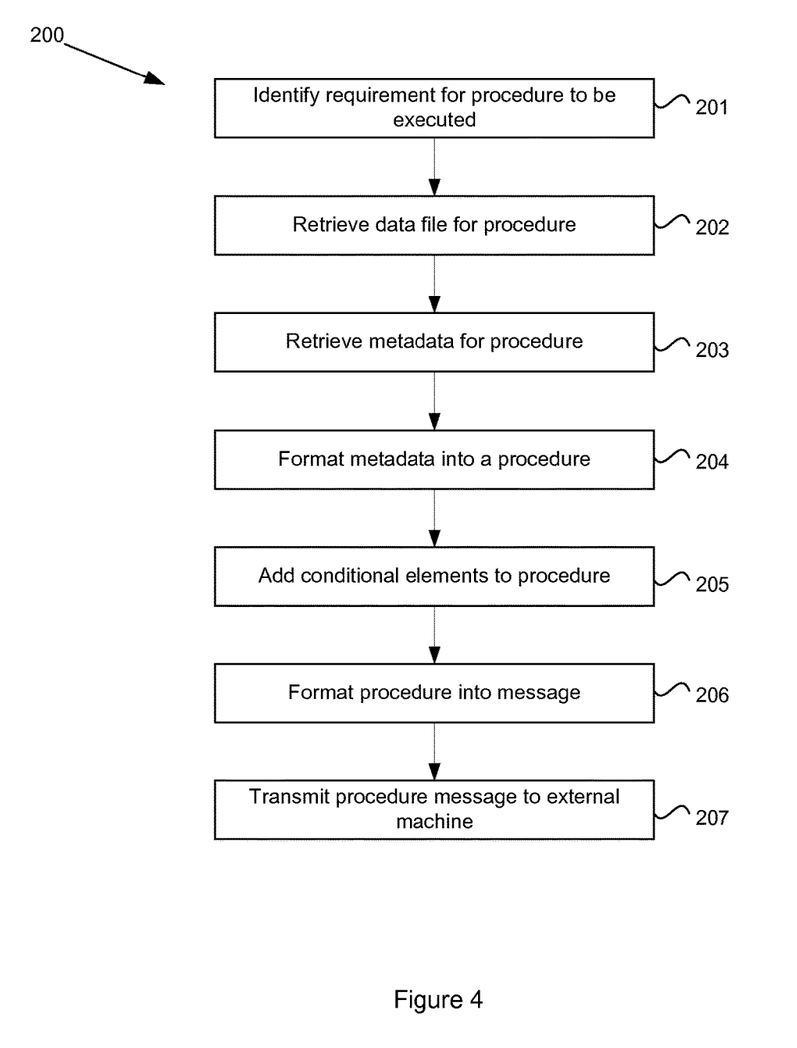
FIGS. 4 and 5 illustrate a method for generating a procedure from metadata.
Figure 5:
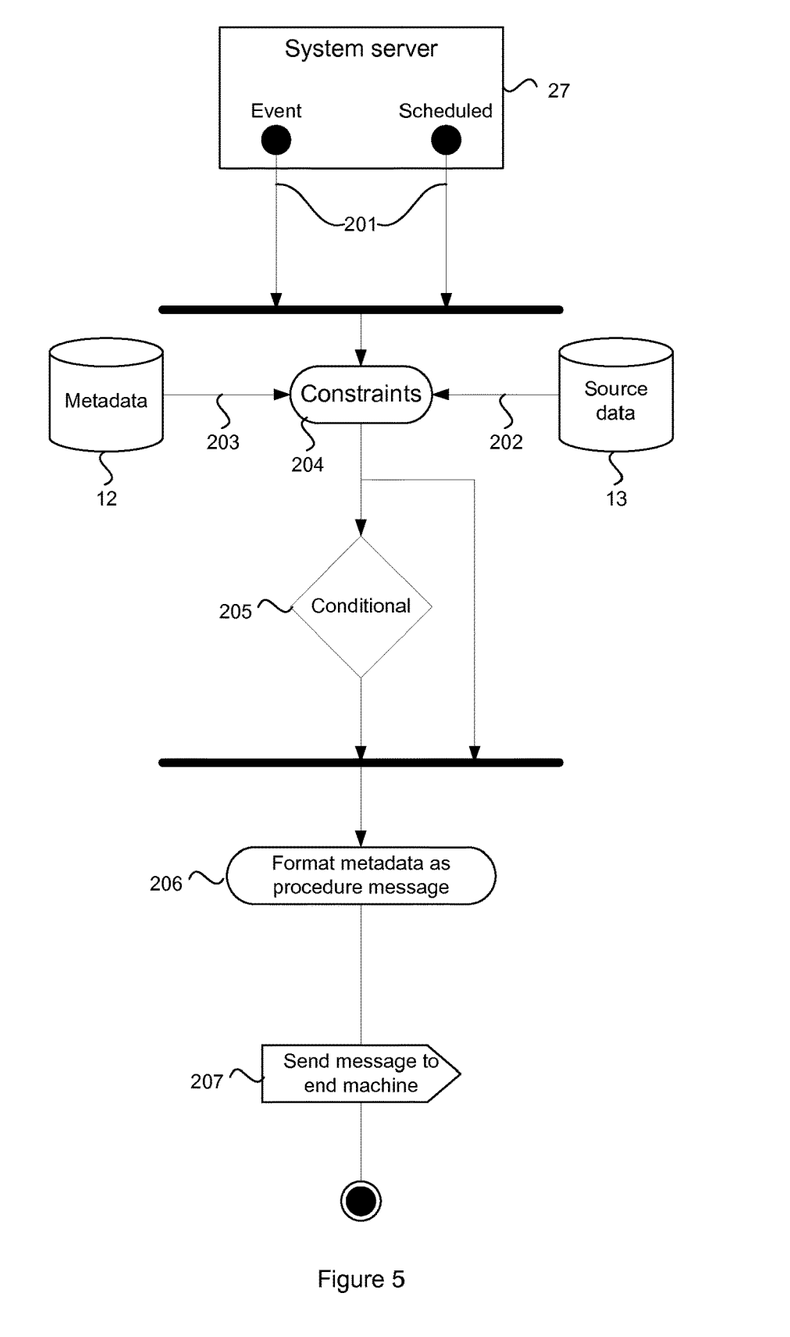

In FIGS. 4 and 5, there is illustrated a process flow 200 for a run book procedure. At step 201, a system server such as the application server 27, identifies the need for a procedure to be executed. The procedure may be started either via a predetermined date-time or by an externally occurring computing system event. At step 202, the application server 27 begins processing the request by retrieving a data file pertaining to the procedure from the data storage 13. The data file provides variable data based on the start action requirement for data definitions. At step 203, the application server 20 retrieves the metadata for the procedure from the metadata storage 12. At step 204, the application server 20 formats the metadata components into a procedure using the variable data from the data file and subject to the metadata constraints. Conditional evaluations (if-then-else) may be added at step 205 and then the procedure may be formatted into a computing system message that can be communicated to an external system 206. The message is transmitted to an external machine (workstation or server) for processing at step 207. The message may be a computer message that encapsulates the procedure actions/results. For example, in step 206, the message may be formatted as an "XML" message packet. The external computer may then format the message per the application or instructions may be utilized to format the message to a human readable format.

Figure 6:
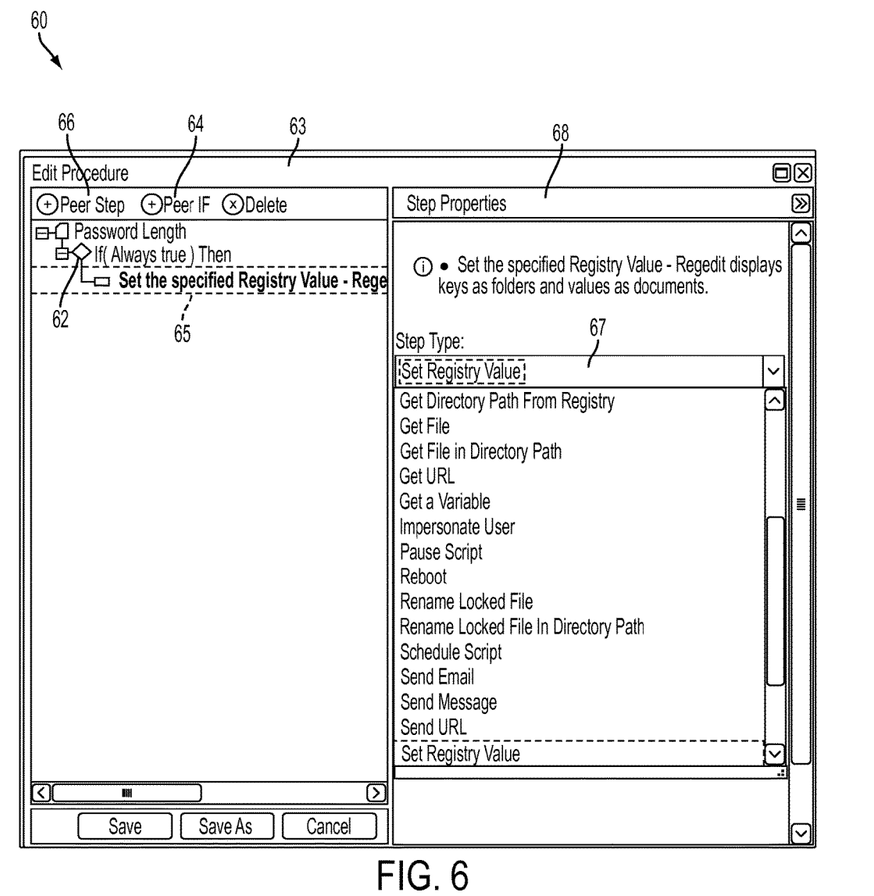
FIG. 6 illustrates a first instance of an interface for defining procedures from metadata elements.
Figure 7:
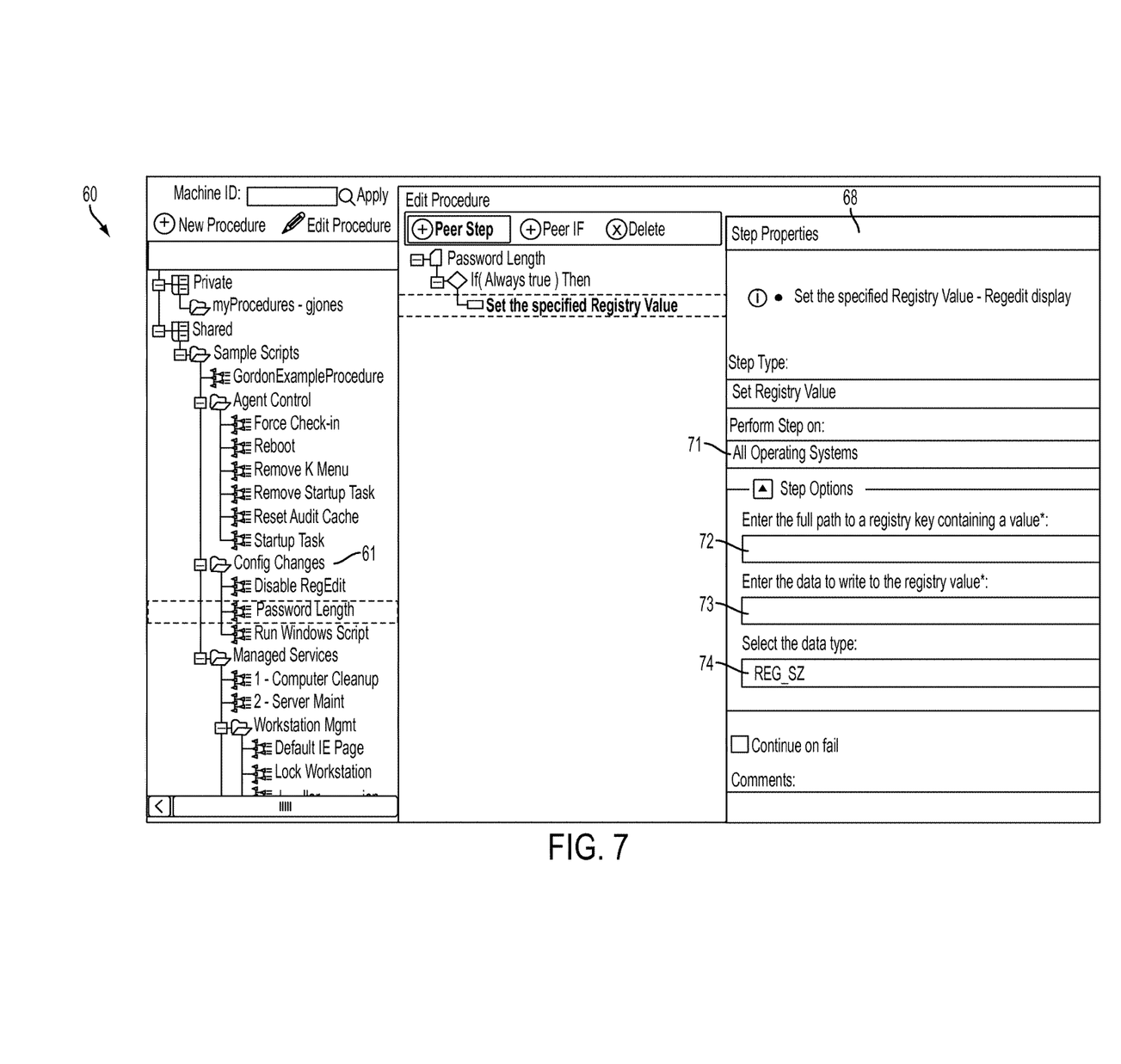
FIG. 7 illustrates a second instance of the interface of FIG. 6.

Metadata driven procedures may be defined through the web server 26. In a specific example, a plurality of workstations may require common configuration changes. These configuration changes may be stored as metadata driven procedures. For example, a procedure to establish a system wide policy for password length may be defined as a metadata driven procedure. During a definition process, a user, operating through an interface such as the interface 60 illustrated in FIG. 6, may create and/or edit a procedure for a password length requirement. The Password Length procedure may be placed in a Configuration Changes category 61 (FIG. 7). Initially, a Conditional requirement (if) 62 may be added in a design window 63 using the "Peer IF" icon 64. In the present example, the Conditional requirement 62 is set to "Always True", meaning that the Conditional requirement will always be met and thus the subsequent steps will always execute. However, in some examples, the conditional requirement may only be satisfied under some conditions.

After the Conditional requirement 62, a procedural step 65 is added using the "Peer Step" icon 66. The step 65 represents a pre-defined verb from the metadata set 12 and is selected by a drop down menu 67 in the Step Properties window 68. In the present example, the "Set Registry Value" verb is selected. Examples of alternative verbs are shown in the Step Properties window 68.

Once the specific metadata verb is selected for the step, additional metadata elements defined in the metadata set 12 as corresponding to the verb are shown, as illustrated in the instance of the interface 60 shown in FIG. 7. For the present example, a policy 71 is set that indicates the operating system(s) on which the step is enacted. In the specific case, the policy 71 indicates that the step is to be enacted on "All operating systems", since this procedure is executed when common configuration changes are required. Other possible values for this policy include a specifically indicated workstation, a list of workstations, a network, a host workstation, or a workstation that provided a procedure request.

Further metadata elements defined for this step include variables for a path to a registry key containing a value 72, a data field 73 containing a specific data value to write to the registry key and the data type 74 of the data that will be written to the registry key. Data for the specific variables is entered and stored in an associated application file in the data storage 13.

The present procedure example shows only a single step (or verb) to be undertaken, however a person skilled in the art will recognize that multiple steps may be defined for a procedure. At the conclusion of the procedure definition, the procedure consists of a series of steps defined by metadata elements.

At some later time, a configuration change request may be received by the application server that triggers the Password Length procedure. When the procedure is triggered, the metadata elements are retrieved from the metadata storage 12 together with the data from the data storage 14. Specifically, the Conditional element 62 and the set registry value 65 verb element are retrieved. To these metadata elements are added the specific data values 72, 73, 74 for the step 65 to complete the formulation of the procedure. The metadata elements are then formatted into a procedure, such as a series of commands that instruct the indicated registry key to be updated to the indicated value having the indicated datatype. The commands are formatted into a message that is sent to all operating systems, in accordance with the policy 71, which process the commands to update the registry value as required.

It can be seen through the above examples, that the metadata elements can be used as the building blocks for procedures. Steps common to multiple procedures may be defined as individual metadata elements. In particular, actions such as the "Set Registry Value" step, may be common to many different procedures. Pre-defining these actions as verbs in the metadata allows the common commands of the step to be defined once only. The variable data, such as the registry path, registry value, and registry value type, may be drawn from an application file pertaining to a specific procedure. For example, a procedure to set the default browser web page may include the same "Set Registry Value" metadata element but may draw its variable data from a different application file which contains the values including a registry path to the default web page register and a value for the default web page address.

Procedures may be defined in a variety of ways and for a variety of purposes as follows:

Module-specific procedures. Module specific procedures may be categorized for each application module. For example, a service desk could have six types of procedures used to automate service desk business processes. Since these procedures apply only to service desk, they are listed in the "Service Desk" category.

Procedures serve dedicated purposes. These procedures may only be selected if they are designed from the beginning to support a particular function. For example, each procedure drop-down selection list in the configuration tables only shows procedures of the appropriate type for that drop-down list.

Specialized IF-ELSE options. Each type of procedure provides only the subset of IF-ELSE commands available that make sense for that type of procedure. This guides users to workable procedure solutions faster.

Events-based vs. Scheduled. Types of procedures are further organized by whether they run immediately (event-based) or run a specified time after an event has occurred (scheduled).

Multiple procedures may be brought together to generate a run book. Run books may be generated for specific procedures, such as for the above definitions, by category, or other appropriate groupings.

Examples of definitions of the different metadata types will now be described.

Variables. The Variables set defines variables used in procedures. A variable may include the following attributes:
Name—The variable name.
Description—A brief description of the variable.
Verb Set—The verb set determines where the variable can be used. Use any verb set type of variable in Policies. Two variables with the same name can be defined, providing they are assigned different verb sets. Set options include:
Notify—Applies to Change Tickets procedures.
Escalate—Applies to Ticket Escalations procedures.
Goal—Applies to Ticket Goals procedures.
Event Dup—Applies to External Event Duplicates procedures.
Event Map—Applies to External Event Maps procedures.
Field Map—Applies to Stage Entry or Exit procedures.
All—Applies to all procedures.
Value—The default value of the variable.
Policies Policies regulate how a set of procedures can be used, including when a resource may be contacted, the method of contact used, resources available and other requirements. A variable can be assigned to a policy. Procedures can both read and override the value set by a policy variable.

In one example, an "Hour's Covered" record is assigned to a Policies record A, and a Policies record is assigned to a stage definition.

A policy may include the following attributes:
Name—The record identifier.
Description—A brief description of the policy.
Policy Hours—Assigns a variable such as Hour's Covered record to this Policy's record.
Contact by—Assign a second variable.
Time Measured Against Coverage—goals and escalations defined include Hours Covered when calculating escalations. For example, if a new event is created, escalation may be scheduled for two hours, and then escalation won't occur until two hours after the next scheduled event period starts. If blank, calendar time alone is used.
Category Categories define the groupings a procedure is under. Generally it is associated with the set of actions that are taken by the procedure (e.g., configuration changes, service desk, back-up, anti-virus, etc.).

A category may include the following attributes:
Name—The record identifier.
Description—A brief description of the policy.
Verbs Verbs define actions to be taken within a procedure. The action is on a variable or on a template. In an example for sending a message, the verb "Send" tells the system to do something on a template "message" with a verb that is passed "data".

The following provides a summary of some additional Step statements:
Add a Note: adds a note to the event being processed by the procedure;
Assign Property: assigns a value to a field;
Execute Script: starts another procedure;
Delete an event: deletes the event being processed by the procedure;
Get Variable: gets an entered value or a value from a file;
Send Email: sends an email to one or more recipients;
Send Message: displays a message in a dialog box on the managed machine;
Set Escalation Time: sets the time for escalation;
Set Goal Time: sets the time a stage goal is scheduled to be completed;
Write Script Log Entry: write a string to the Script Log.

The following provides a summary of some additional conditional (if/else) statements:
Check a Variable: evaluate a given variable;
Test a Property Value of the New Ticket: compares the value of a field to a specified value or variable;
Test Property Value of the Receipt: compares the value of a field in an inbound email to a specified value or variable.

A user may create, define and edit any of these metadata elements through the interface 60 illustrated in FIGS. 6 and 7. In one embodiment, the interface 60 may be provided through the web server 26.

The web server 26 also provides an interface to format a procedure into a computing system message that shall be transmitted to an end machine. The message may be acted on by an agent resident on the end user machine.

One use of the systems described above is the formulation of run books. Metadata driven run books have advantage over the way run books are historically put together including the ability to provide computing system procedure driven activities and have them self document the business process.

Figure 8:
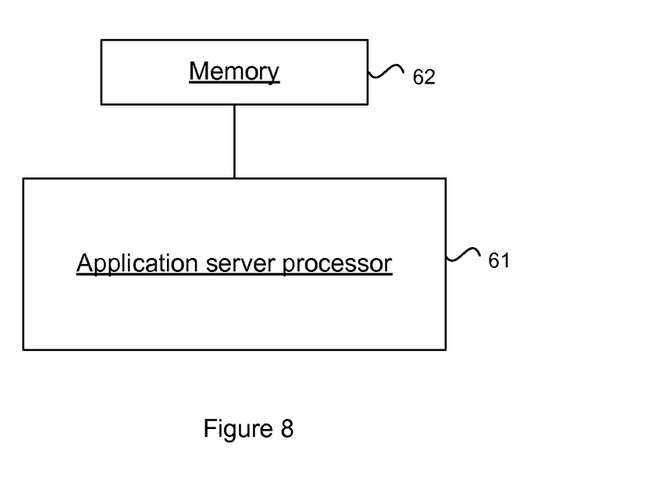
FIG. 8 illustrates a processor and memory of an application server.
Figure 9:
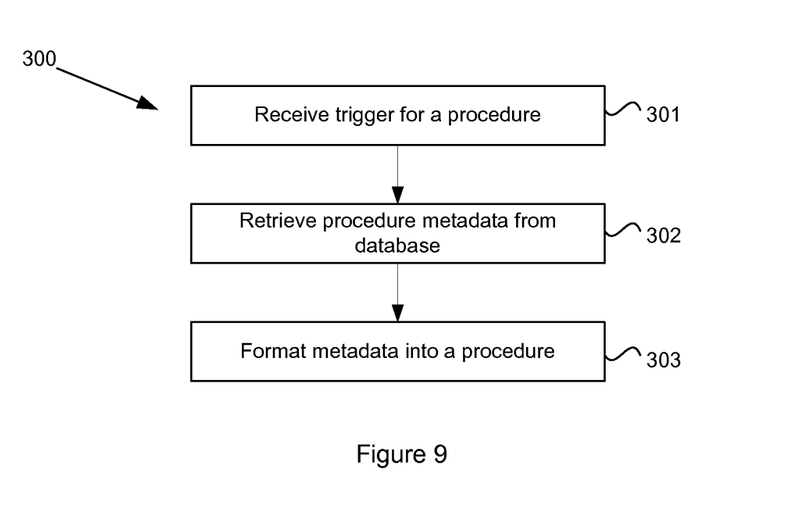
FIG. 9 illustrates an instruction set that may be executed on the processor and memory of FIG. 8.

The components of the systems 10, 20 may be embodied in hardware, software, firmware or a combination of hardware, software and/or firmware. In a hardware embodiment, the application server 27 may be provided in a device, such as a computer, etc including a processor 61 operatively associated with a memory 62 as shown in FIG. 8. The memory 62 may store instructions that are executable on the processor 61. An instruction set 300 that may be executed on the application server processor 61 is depicted in the flowchart of FIG. 9. Specifically, when executed, the instruction set 300 allows the processor to receive a trigger for a procedure 301. In response to the trigger, the processor 61 may retrieve metadata for the procedure from a database (step 302), such as the metadata database 12 shown in FIG. 2. Though not depicted, the processor may also retrieve variable data for the procedure from the variable datastore 13. At step 303, the processor 61 formats the metadata and any variable data into a procedure.

Figure 10:
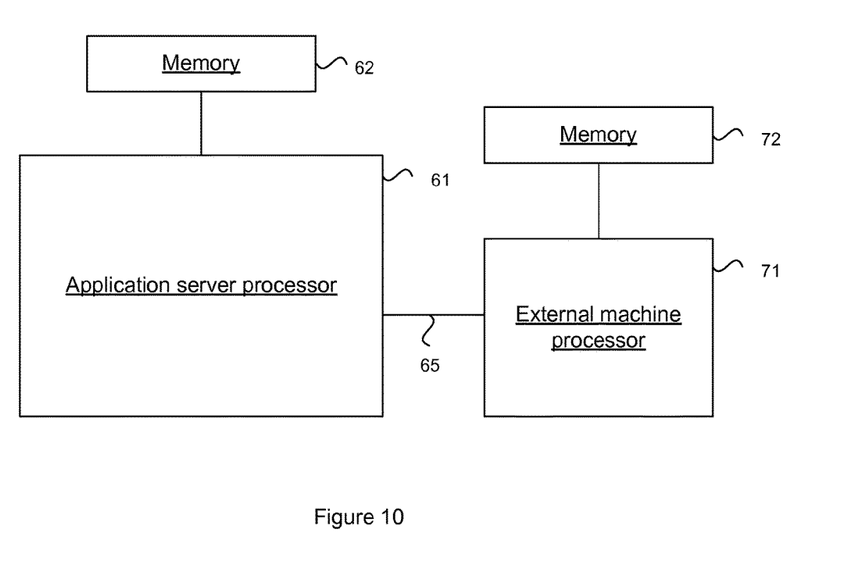
FIG. 10 illustrates the processor and memory of FIG. 8 in association with a processor and memory of an external machine.

As shown in FIG. 10, the application processor 61 may communicate with further processors, such as an external machine processor 71 with associated memory 72, through a suitable communications link 65. Through the communications link, the application server processor 61 may provide the formatted procedure messages for execution on the external machine.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for creating and managing automated computing system run book events comprising:
    defining a plurality of metadata elements;
    storing the plurality of metadata elements in a database;
    defining at least one procedure of a plurality of procedures comprising at least one of the plurality of metadata elements;
    receiving a configuration change request for the at least one procedure;
    retrieving at least one data file comprising variable data defining a format for the metadata, wherein the variable data comprises a variable name, a description of the variable, and wherein the at least one data file further comprises a verb identifying the at least one of the plurality of procedures which can be used with the variable;
    defining the verb as one or more actions in the metadata which are to be performed to the at least one procedure comprising at least an update action;
    setting a policy for the at least one procedure indicating at least one workstation and at least one operating system on which to enact the at least one procedure;
    responsive to receiving the configuration change request, triggering the at least one procedure, retrieving the metadata elements for the procedure including a conditional requirement element indicating at least one condition required to perform the procedure and a procedural step identifying the verb associated with the update action;
    formatting the retrieved metadata elements into the at least one procedure using variable data from the data file, the retrieved metadata elements comprising a series of commands corresponding to the plurality of actions instructing a registry key to be updated to an indicated value and to an indicated datatype; and
    formatting the at least one procedure into a message and transmitting the formatted at least one procedure to at least one external machine identified as the at least one workstation and having the at least one operating system set by the policy.

2. The method according to claim 1 comprising executing the at least one procedure on the at least one external machine.

3. The method according to claim 1 comprising, for at least one metadata element, defining at least one variable data element.

4. The method according to claim 3 comprising retrieving data for the at least one variable data element, wherein formatting the retrieved metadata elements into the at least one procedure comprises incorporating the retrieved data into the at least one variable data element of the respective metadata element.

5. The method according to claim 4 wherein the retrieved data is retrieved from an application file specific to the procedure.

6. The method according to claim 1 wherein defining at least one of the plurality of the metadata elements comprises defining one or more verbs associated with the at least one procedure.

7. The method according to claim 6 comprising defining one or more variables relating to the one or more verbs.

8. A system for generating a run book comprising:
    at least one database, including a processor, that stores a plurality of metadata elements, a plurality of application files comprising variable data and a plurality of procedure definitions defined using at least one of the plurality of metadata elements and at least one of the application files; and
    an application server, including a processor, configured to retrieve the metadata elements for at least one procedure of a plurality of procedures responsive to receiving a configuration change request for the at least one procedure, the metadata elements comprising a conditional requirement indicating at least one condition required to perform the at least one procedure and a procedural step identifying a verb associated with the update action,
    trigger the at least one procedure,
    define the verb as one or more actions in the metadata comprising at least an update action,
    set a policy for the at least one procedure indicating at least one workstation and at least one operating system on which to enact the at least one procedure,
    format the retrieved metadata elements into the at least one procedure using variable data from at least one of the application files comprising variable data defining a format for the metadata, wherein the variable data comprises a variable name, a description of the variable, and wherein the at least one data file further comprises the verb identifying the at least one of the plurality of procedures which can be used with the variable, the retrieved metadata elements comprising a series of commands corresponding to the plurality of actions instructing a registry key to be updated to an indicated value and to an indicated datatype, extract a plurality of procedure definitions from the plurality of application files, format the plurality of procedure definitions into a run book, and format the at least one procedure into a message and transmit the formatted at least one procedure to at least one external machine identified as the at least one workstation and having the at least one operating system set by the policy.

9. The system according to claim 8 wherein the plurality of metadata elements define common components of the procedural step and wherein the variable data comprises variable components of the procedural step.

10. The system according to claim 8 comprising an interface configured to allow a user to define the at least one procedure by selecting one or more of the metadata definitions.

11. The system according to claim 10 wherein the interface allows a user to define one or more metadata definitions.

12. The system according to claim 8 wherein the application server is configured to transmit the run book to an external machine.

13. The system according to claim 8 wherein the application server is configured to format the run book into a machine readable format such that at least one of the procedures of the run book is able to be executed by the external machine.

14. The system according to claim 8 comprising:
at least one processor configured to:
retrieve a procedure definition from the database;
retrieve one or more metadata elements and one or more application files pertaining to the retrieved procedure definition; and
format the one or more retrieved metadata elements and the variable data of the one or more retrieved application files into a computer executable procedure message.

15. A non-transitory computer-readable storage medium comprising computer-executable instructions for execution by a processor, that, when executed, cause the processor to:

define a plurality of metadata elements;
store the plurality of metadata elements in a database;
define at least one procedure of a plurality of procedures comprising at least one of the plurality of metadata elements;
receive a configuration change request as a trigger for the at least one procedure comprising at least one of the plurality of metadata elements;
retrieve at least one data file comprising variable data defining a format for the metadata, wherein the variable data comprises a variable name, a description of the variable, and a verb identifying the at least one of the plurality of procedures which can be used with the variable;
define the verb as one or more actions in the metadata which are to be performed to the least one procedure comprising at least an update action;
set a policy for the at least one procedure indicating at least one workstation and at least one operating system on which to enact the at least one procedure,
retrieve metadata elements for the at least one procedure from a database the metadata elements comprising a conditional requirement element indicating at least one condition required to perform the procedure and a procedural step identifying the verb associated with the update action;
format the metadata elements into the at least one procedure using variable data from the data file, the retrieved metadata elements comprising a series of commands corresponding to the plurality of actions instructing a registry key to be updated to an indicated value and to an indicated datatype; and
format the at least one procedure into a message and transmitting the formatted at least one procedure to at least one external machine identified as the at least one workstation and having the at least one operating system set by the policy.

16. The non-transitory computer readable storage medium according to claim 15 comprising instructions that cause the processor to communicate the formatted procedure to a second processor.

17. The non-transitory computer readable storage medium according to claim 15 comprising instructions that cause the second processor to execute the procedure.

18. The non-transitory computer readable storage medium according to claim 15 comprising retrieving variable data from a database, wherein formatting the metadata into the at least one procedure comprises incorporating the retrieved variable data.

* * * * *